(12) United States Patent
Mayer

(10) Patent No.: US 8,458,950 B2
(45) Date of Patent: *Jun. 11, 2013

(54) BLOOD SIMULATING ADD-ON FOR FISHING LURES

(76) Inventor: James D. Mayer, Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/323,062

(22) Filed: Dec. 12, 2011

(65) Prior Publication Data

US 2012/0079758 A1    Apr. 5, 2012

Related U.S. Application Data

(62) Division of application No. 12/289,320, filed on Oct. 24, 2008, now Pat. No. 8,091,271.

(60) Provisional application No. 60/996,582, filed on Nov. 26, 2007, provisional application No. 61/129,281, filed on Jun. 16, 2008.

(51) Int. Cl.
*A01K 85/00* (2006.01)

(52) U.S. Cl.
USPC ....... 43/42.32; 43/42.09; 43/42.24; 43/42.26; 43/42.28

(58) Field of Classification Search
USPC ............ 43/42.09, 42.32, 42.39, 42.24, 42.26, 43/42.28, 42.36, 44.87, 44.9, 44.91
See application file for complete search history.

(56) References Cited

U.S. PATENT DOCUMENTS

| | | | | |
|---|---|---|---|---|
| 271,424 A * | 1/1883 | Comstock | 43/42.36 |
| 1,067,178 A * | 7/1913 | Lambert | 43/42.34 |
| 1,325,651 A * | 12/1919 | Pajeau | 43/42.26 |
| 1,569,993 A * | 1/1926 | MacLeod | 43/42.26 |
| 1,599,763 A * | 9/1926 | Head | 43/42.09 |
| 1,723,557 A * | 8/1929 | Ono | 43/42.28 |
| 1,754,567 A * | 4/1930 | Newell | 43/42.28 |
| 1,822,785 A * | 9/1931 | Petrie | 43/42.36 |
| 1,854,027 A * | 4/1932 | Gruenhagen | 43/42.36 |
| 2,006,604 A * | 7/1935 | Post | 43/42.36 |
| 2,102,739 A * | 12/1937 | Peters | 43/42.32 |
| 2,123,150 A * | 7/1938 | Larson et al. | 43/42.32 |
| 2,261,549 A * | 11/1941 | Hayes | 43/42.36 |
| 2,333,425 A * | 11/1943 | Jackson, Sr. | 43/42.28 |
| 2,465,064 A * | 3/1949 | Colosimo | 43/42.09 |
| 2,481,789 A * | 9/1949 | Smith | 43/42.15 |
| 2,583,942 A * | 1/1952 | Harvey | 43/42.26 |
| 2,586,186 A * | 2/1952 | Swanberg | 43/42.39 |
| 2,603,025 A * | 7/1952 | Brown | 43/42.28 |
| 2,612,717 A * | 10/1952 | Kuehnel | 43/42.28 |
| 2,621,437 A * | 12/1952 | Pedranti | 43/42.36 |
| 2,636,304 A * | 4/1953 | Swenson | 43/42.36 |
| 2,694,844 A * | 11/1954 | Grumbach | 43/42.24 |

(Continued)

FOREIGN PATENT DOCUMENTS

DE    19513689 A1 *    2/1996
FR    2593354 A1 *    7/1987

(Continued)

*Primary Examiner* — Darren W Ark
(74) *Attorney, Agent, or Firm* — Sherrill Law Offices, PLLC

(57) ABSTRACT

A fishing lure attachment that includes (i) an elastic collar operable for fitted engagement and disengagement around a fishing lure body, and (ii) a flexible ball chain, having a plurality of spherical elements serially interconnected by rod members to form a chain of balls simulating a flow of blood droplets, attached to and extending from the collar.

6 Claims, 11 Drawing Sheets

U.S. PATENT DOCUMENTS

| | | | |
|---|---|---|---|
| 2,698,494 A * | 1/1955 | Larsen | 43/42.36 |
| 2,703,945 A * | 3/1955 | Johnson | 43/42.36 |
| 2,722,766 A * | 11/1955 | Accetta | 43/42.36 |
| 2,765,572 A * | 10/1956 | Woolfe | 43/42.28 |
| 2,778,143 A * | 1/1957 | Bratz, Sr. | 43/42.05 |
| 2,792,662 A * | 5/1957 | Norton | 43/42.36 |
| 2,814,086 A * | 11/1957 | Bahr | 43/44.83 |
| 2,847,792 A * | 8/1958 | Kuhlmann | 43/44.9 |
| 2,865,130 A * | 12/1958 | Accetta | 43/42.24 |
| 2,896,360 A * | 7/1959 | Lucas | 43/44.2 |
| 2,912,784 A * | 11/1959 | Carlin | 43/42.24 |
| 2,983,065 A * | 5/1961 | Ferguson et al. | 43/42.28 |
| 2,983,067 A * | 5/1961 | Saywell, Jr. | 43/44.9 |
| 3,017,716 A * | 1/1962 | Hawks | 43/42.36 |
| 3,040,466 A * | 6/1962 | Jablonski | 43/42.24 |
| 3,043,044 A * | 7/1962 | Metzler | 43/44.87 |
| 3,078,611 A * | 2/1963 | Nishioka | 43/42.36 |
| 3,079,723 A * | 3/1963 | Roes | 43/42.26 |
| 3,110,979 A * | 11/1963 | Woodley | 43/42.28 |
| 3,141,255 A * | 7/1964 | Randall | 43/42.11 |
| 3,186,123 A * | 6/1965 | Freeman | 43/42.1 |
| 3,245,171 A * | 4/1966 | Henry | 43/42.24 |
| 3,271,893 A * | 9/1966 | Bowers | 43/44.9 |
| 3,343,296 A * | 9/1967 | Davis | 43/42.28 |
| 3,405,474 A * | 10/1968 | Lewis | 43/42.24 |
| 3,426,467 A * | 2/1969 | Bryant | 43/42.28 |
| 3,427,744 A * | 2/1969 | Roberts | 43/42.05 |
| 3,429,066 A * | 2/1969 | McClellan | 43/42.24 |
| 3,440,757 A * | 4/1969 | McClellan | 43/42.36 |
| 3,537,207 A * | 11/1970 | McClellan et al. | 43/42.24 |
| 3,568,351 A * | 3/1971 | Perrin | 43/42.31 |
| 3,589,052 A * | 6/1971 | King | 43/44.91 |
| 3,654,724 A * | 4/1972 | Charron | 43/42.28 |
| 3,685,192 A * | 8/1972 | Stibbard | 43/42.24 |
| 3,708,903 A * | 1/1973 | Bercz et al. | 43/42.09 |
| 3,762,092 A * | 10/1973 | Bercz et al. | 43/42.09 |
| 3,786,595 A * | 1/1974 | Croce | 43/44.91 |
| 3,867,781 A * | 2/1975 | Wolfe | 43/42.09 |
| 3,918,192 A * | 11/1975 | Rabideau | 43/42.17 |
| 3,964,203 A * | 6/1976 | Williams, Jr. | 43/42.29 |
| 3,965,606 A * | 6/1976 | Bingler | 43/42.39 |
| 4,044,491 A * | 8/1977 | Potter | 43/42.28 |
| 4,049,165 A * | 9/1977 | Goldhaft | 43/18.1 R |
| 4,142,319 A * | 3/1979 | Mihaljevic | 43/42.39 |
| 4,164,826 A * | 8/1979 | Metzler et al. | 43/42.39 |
| 4,235,037 A * | 11/1980 | Sivertsen | 43/44.91 |
| 4,530,180 A * | 7/1985 | Gwaldacz et al. | 43/42.28 |
| 4,599,821 A * | 7/1986 | Martin | 43/42.23 |
| 4,617,753 A * | 10/1986 | Pauley et al. | 43/42.09 |
| 4,785,569 A * | 11/1988 | Thomas, Jr. | 43/42.24 |
| 4,815,229 A * | 3/1989 | Nicholson, III | 43/42.28 |
| 4,831,764 A * | 5/1989 | Jecevicus | 43/42.26 |
| 4,831,770 A * | 5/1989 | Dworski | 43/42.28 |
| 4,858,368 A * | 8/1989 | Tolner et al. | 43/42.36 |
| 4,858,371 A * | 8/1989 | Preiser | 43/43.16 |
| 4,864,766 A * | 9/1989 | Bohn | 43/42.39 |
| 4,870,776 A * | 10/1989 | Schock | 43/42.09 |
| 4,888,909 A * | 12/1989 | Adams | 43/42.39 |
| 4,893,430 A * | 1/1990 | Barfield | 43/42.24 |
| 4,941,280 A * | 7/1990 | Rinaldi | 43/42.36 |
| 5,193,300 A * | 3/1993 | Johnson | 43/43.13 |
| 5,245,782 A * | 9/1993 | Pahle | 43/42.32 |
| 5,375,366 A * | 12/1994 | Johnson | 43/43.13 |
| 5,386,658 A * | 2/1995 | Ferguson et al. | 43/44.9 |
| 5,456,040 A * | 10/1995 | Dickens | 43/42.39 |
| 5,491,927 A * | 2/1996 | Ortiz | 43/42.28 |
| 5,499,472 A * | 3/1996 | Krenn | 43/43.1 |
| 5,551,185 A * | 9/1996 | Reed | 43/42.09 |
| 5,560,142 A * | 10/1996 | Dickens | 43/42.25 |
| 5,647,163 A * | 7/1997 | Gorney | 43/42.28 |
| 5,709,047 A * | 1/1998 | Link | 43/42.28 |
| 5,806,234 A * | 9/1998 | Nichols | 43/42.39 |
| 5,822,913 A * | 10/1998 | Lau | 43/42.28 |
| 5,887,381 A * | 3/1999 | Stephenson | 43/43.15 |
| 5,953,849 A * | 9/1999 | Boucher, Jr. | 43/42.24 |
| 6,073,383 A * | 6/2000 | Line | 43/42.24 |
| 6,122,855 A * | 9/2000 | Heuke | 43/42.09 |
| 6,199,312 B1 * | 3/2001 | Link | 43/42.28 |
| 6,212,818 B1 * | 4/2001 | Huddleston | 43/42.09 |
| 6,226,917 B1 * | 5/2001 | Sylla et al. | 43/42.09 |
| 6,230,433 B1 * | 5/2001 | Nichols | 43/42.39 |
| 6,240,672 B1 * | 6/2001 | Huppert | 43/42.39 |
| 6,243,982 B1 * | 6/2001 | Halterman, Jr. | 43/42.2 |
| 6,393,756 B1 * | 5/2002 | Forney et al. | 43/42.09 |
| 6,405,477 B1 * | 6/2002 | Huppert | 43/42.24 |
| 6,408,566 B1 * | 6/2002 | Ward, Sr. | 43/42.24 |
| 6,665,977 B2 * | 12/2003 | Hammond | 43/42.36 |
| 6,675,525 B1 * | 1/2004 | Ford | 43/42.24 |
| 6,678,992 B1 * | 1/2004 | Clark | 43/42.24 |
| 6,718,684 B2 * | 4/2004 | Yong-Set | 43/42.39 |
| 6,745,511 B1 * | 6/2004 | Falconer | 43/44.9 |
| 6,772,553 B2 * | 8/2004 | Phillips et al. | 43/42.39 |
| 6,775,945 B2 * | 8/2004 | Gibbs et al. | 43/42.28 |
| 6,836,996 B1 * | 1/2005 | Huppert | 43/42.39 |
| 6,898,894 B1 * | 5/2005 | Anderson | 43/42.39 |
| 7,114,285 B1 * | 10/2006 | Ince | 43/42.28 |
| 7,124,535 B2 * | 10/2006 | Trembone et al. | 43/17.6 |
| 7,174,670 B2 * | 2/2007 | Lizardo et al. | 43/42.24 |
| 7,284,348 B1 * | 10/2007 | Nugent | 43/42.24 |
| 7,360,335 B2 * | 4/2008 | Edwards | 43/42.28 |
| 7,415,792 B1 * | 8/2008 | Noble | 43/44.87 |
| 7,934,339 B2 * | 5/2011 | Richie | 43/42.32 |
| 8,091,271 B2 * | 1/2012 | Mayer | 43/42.32 |
| 8,230,639 B2 * | 7/2012 | Langer et al. | 43/42.28 |
| 2002/0073607 A1 * | 6/2002 | Hickok et al. | 43/42.28 |
| 2003/0046858 A1 * | 3/2003 | Meraw | 43/42.28 |
| 2004/0216356 A1 * | 11/2004 | Matchinga | 43/42 |
| 2006/0075678 A1 * | 4/2006 | Schammel et al. | 43/42.09 |
| 2006/0112608 A1 * | 6/2006 | Snyder | 43/42.36 |
| 2006/0156612 A1 * | 7/2006 | Brzozowski | 43/43.15 |
| 2006/0260180 A1 * | 11/2006 | Hong | 43/42.39 |
| 2007/0044368 A1 * | 3/2007 | Duckett | 43/42.39 |
| 2007/0107296 A1 * | 5/2007 | Hollomon | 43/42.28 |
| 2008/0222940 A1 * | 9/2008 | Dudley | 43/42.39 |
| 2008/0295384 A1 * | 12/2008 | Emmott | 43/42.09 |
| 2008/0313948 A1 * | 12/2008 | Lewis | 43/42.28 |
| 2009/0126256 A1 * | 5/2009 | Gregory | 43/42.09 |
| 2009/0172993 A1 * | 7/2009 | Willis et al. | 43/42.28 |
| 2009/0211144 A1 * | 8/2009 | Murphy | 43/42.39 |
| 2010/0263259 A1 * | 10/2010 | Cuthbert | 43/42.24 |

FOREIGN PATENT DOCUMENTS

| | | | |
|---|---|---|---|
| FR | 2806875 A1 * | 10/2001 | |
| GB | 2258128 A * | 2/1993 | |
| GB | 2398717 A * | 9/2004 | |
| JP | 2000217471 A * | 8/2000 | |
| JP | 2000354435 A * | 12/2000 | |
| JP | 2003079277 A * | 3/2003 | |
| JP | 2003116412 A * | 4/2003 | |
| JP | 2003289760 A * | 10/2003 | |
| JP | 2003304781 A * | 10/2003 | |
| JP | 2003339276 A * | 12/2003 | |
| JP | 2004049101 A * | 2/2004 | |
| JP | 2004129566 A * | 4/2004 | |
| JP | 2005176769 A * | 7/2005 | |
| JP | 2006311825 A * | 11/2006 | |
| JP | 2007222043 A * | 9/2007 | |
| JP | 2008118898 A * | 5/2008 | |
| JP | 2008182995 A * | 8/2008 | |
| WO | WO 9957972 A1 * | 11/1999 | |

* cited by examiner

BLOOD SIMULATING ADD-ON FOR FISHING LURES

This application is a divisional application of U.S. application Ser. No. 12/289,320, filed Oct. 24, 2008, and claims the benefit of U.S. Provisional Patent Application Ser. No. 60/996,582, filed Nov. 26, 2007 and U.S. Provisional Application Ser. No. 61/129,281, filed Jun. 16, 2008.

BACKGROUND OF THE INVENTION

1. Field of the Invention

The present invention relates to fishing lures, and more particularly to a blood-simulating fishing lure that uses a float, plug, or other artificial lure body and a ball-chain to simulate a wounded and bleeding baitfish.

2. Description of the Related Art

The use of fishing lures or other artificial devices that simulate the movement or appearance of natural or live bait is well known. Because game fish, like northern pike or walleyes, feed on insects, minnows, frogs, worms, and even small birds or mammals, it has been common to fish with live baits. Bloodworms and minnows have seen the most use, with varying degrees of success. The use of live bait does have drawbacks. Some live bait is not available in all areas or at certain times of the year. Some live bait may be expensive to purchase, and of course all live bait dies with use. Additionally, the use of certain types of bait and baitfish, such as frogs or minnows, can be restricted in certain areas, and in some areas it is illegal to fish with live bait.

Because game fish are predatory in nature, a variety of artificial lures have been developed over the years. Most commonly, these lures are designed to emulate as closely as possible the natural prey of the game fish. Many of these lures were designed to be pulled through the water, or bounced up and down in the water, to simulate the movements of injured or wounded prey, as it is presumed that injured or wounded prey appears more vulnerable and thus more attractive to the predatory game fish. In addition, spinners, propellers and other objects have been attached to lures to attract the attention of a hungry fish. Other lures have been designed to incorporate scents and aromas of various types. Scents lose potency with use, however, and many artificial lures are not natural in appearance.

Thus, a blood-simulating fishing lure solving the aforementioned problems is desired.

SUMMARY OF THE INVENTION

The blood-simulating fishing lure has an artificial lure body, for example, a float, jig, or plug, with an attached fishhook and a length of ball chain made of aluminum or other similar lightweight material. The ball chain is painted a color, such as red, to simulate blood. A hole is drilled completely through the artificial lure body, and the length of ball chain is threaded through the artificial lure body, the two ends of the chain extending at approximately equal lengths on each side of the body. The blood-simulating fishing lure is then attached to a fishing line.

In one embodiment, the buoyancy of the float may impart a natural motion to the lure, and the lightness of the metal or other lightweight material from which the chain is made allows both ends of the chain, extending on each side of the float, to move naturally in the water and give the appearance of blood flowing from a wounded and bleeding baitfish.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
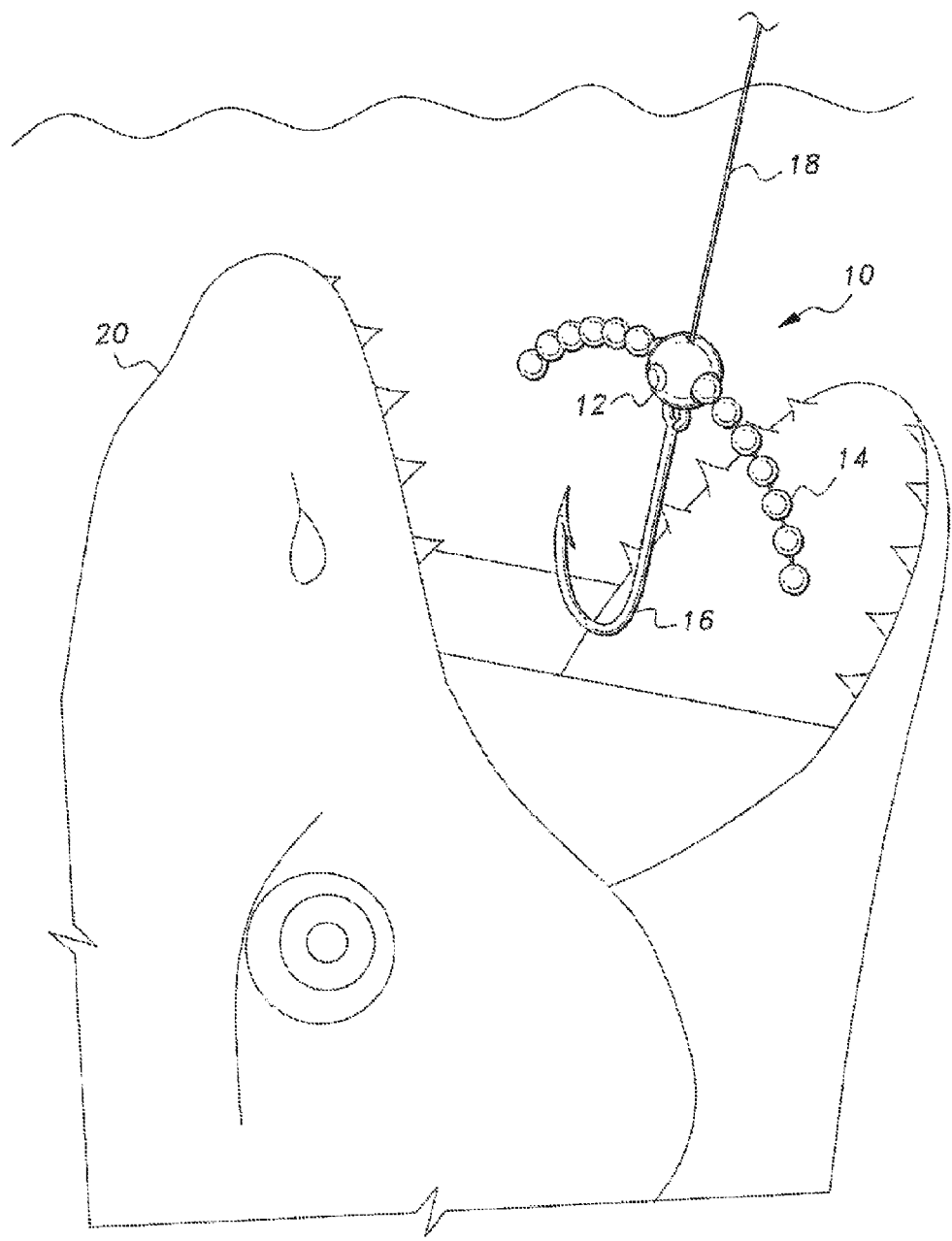
FIG. 1 is an environmental, perspective view of a blood-simulating fishing lure according to the present invention.

The present invention relates to a blood-simulating fishing lure, hereinafter designated as 10, designed to simulate a wounded and bleeding baitfish as it moves through the water. As the embodiment illustrated by FIG. 1 shows, the blood-simulating fishing lure 10 comprises a float 12, a ball chain 14 (lightweight balls connected by a flexible element, such as string, wire, monofilament, leader line, etc.), a fishhook 16 and fishing line 18. FIG. 1 shows the blood-simulating fishing lure 10 being taken by a fish 20. The balls or spherical elements of the ball chain 14 are preferably made of aluminum, plastic, or other lightweight material, and may be colored red to further simulate the appearance of blood droplets.

Figure 2:
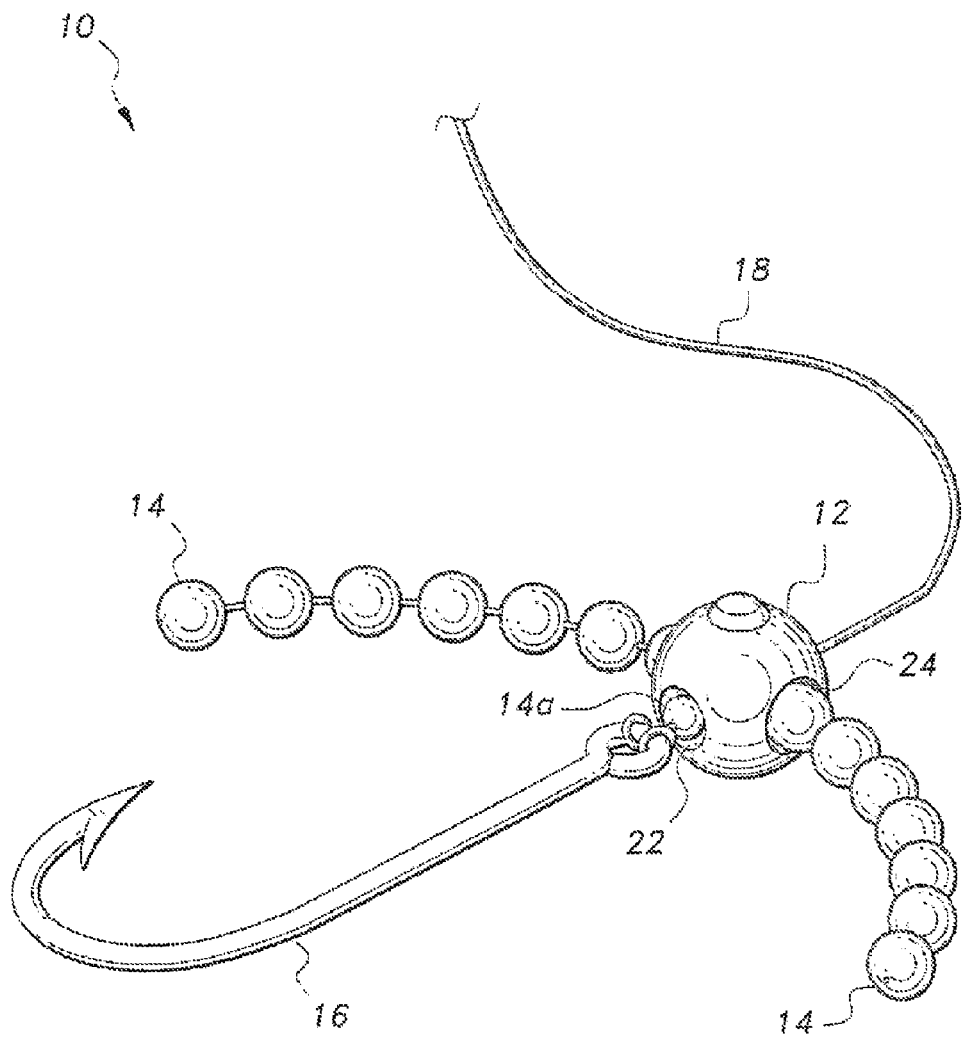
FIG. 2 is a perspective view of a blood-simulating fishing lure according to the present invention, showing the threading for the fishing line and ball chain.
Figure 3:
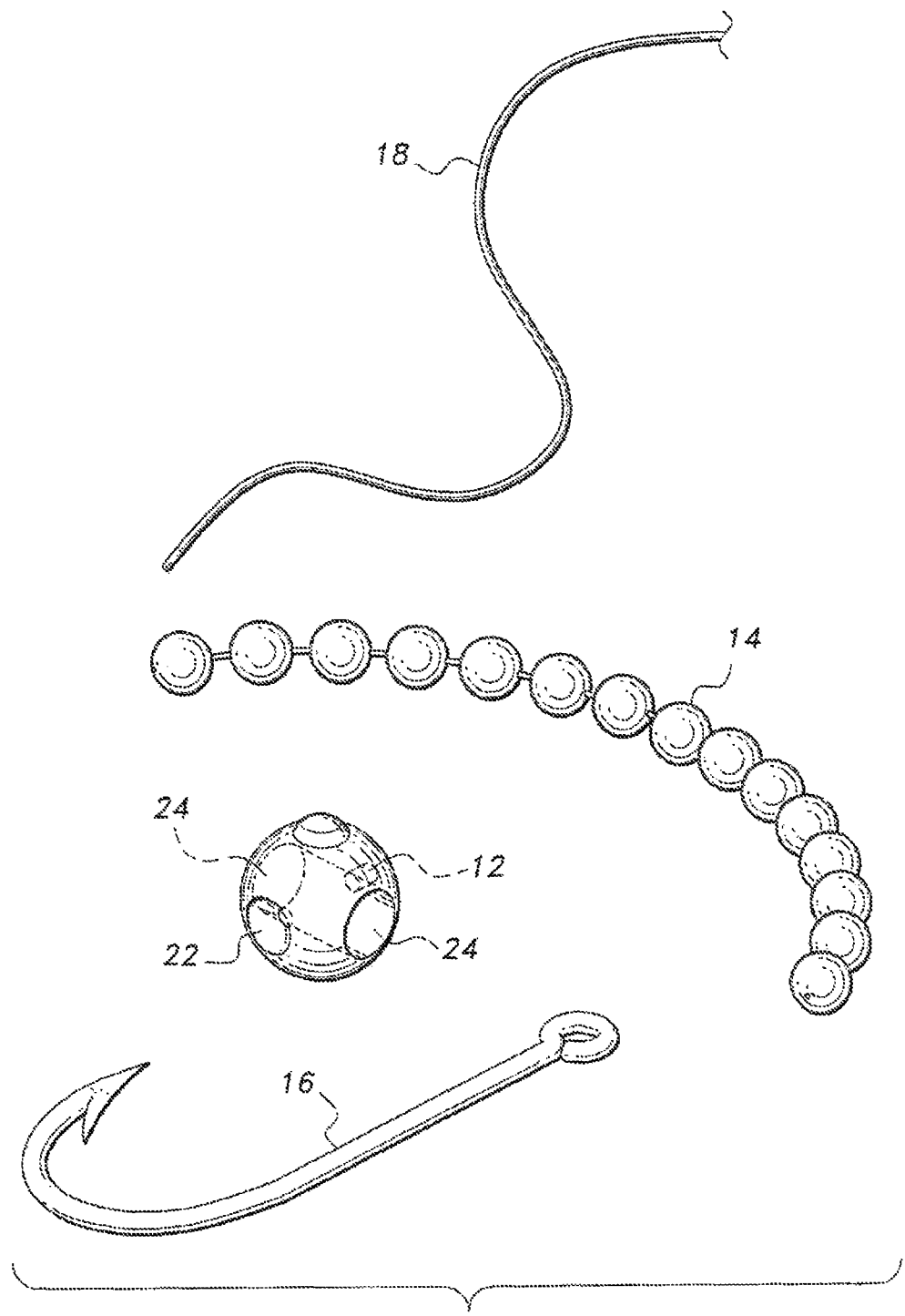
FIG. 3 is an exploded view of a blood-simulating fishing lure according to the present invention, showing the component parts of the lure.

FIG. 2 is a perspective view illustrating how the fishing line 18 attaches to the fishhook 16 through a hole 22 in the body of the float 12. The hole 22 that accommodates the fishing line 18 is drilled perpendicular to the hole 24 that accommodates the ball chain 14. A bead 14a (approximately 4 mm in diameter) is disposed adjacent the eyelet of fishhook 16 to prevent the erosion of the float 12 against the metal fishhook. FIG. 3 is an exploded view of the blood-simulating fishing lure 10 showing the relative positions of the hole 24 where the ball chain 14 is threaded, and the hole 22 where the fishing line 18 is threaded before attaching to the fishhook 16 (bead 14a not shown).

The embodiment of the fishing lure 10 illustrated by FIGS. 1-3 contemplates the use of the blood-simulating fishing lure with live bait, such as worms, minnows or frogs.

Figure 4:
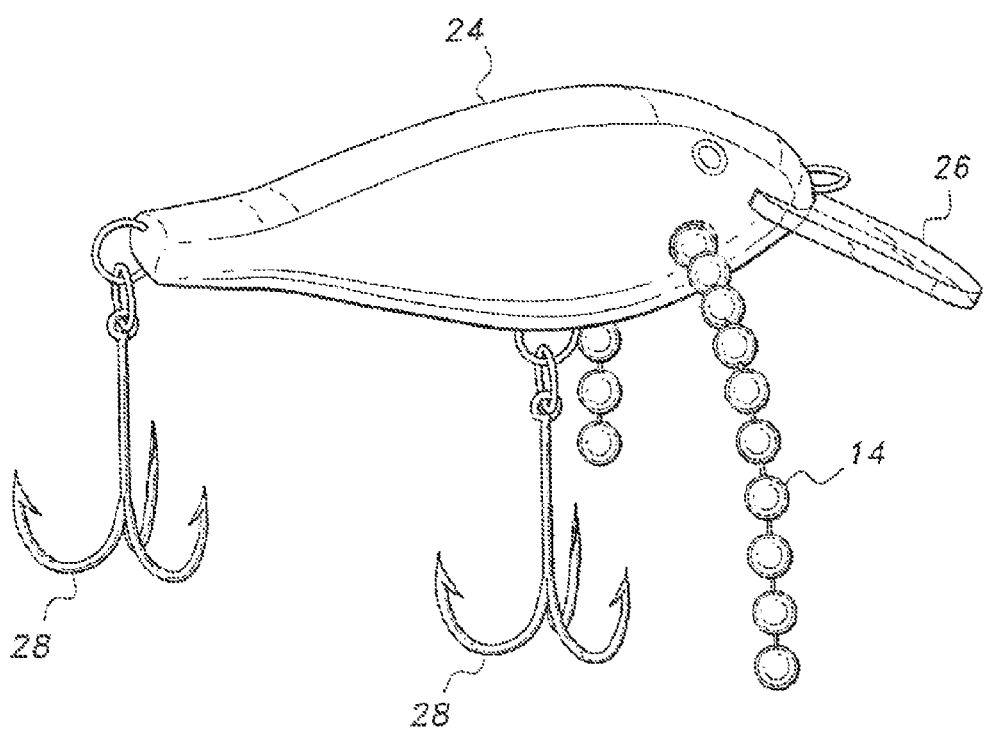
FIG. 4 is a perspective view of a second embodiment of a blood simulating fishing lure according to the present invention, showing the ball chain threaded through a plug.

FIG. 4 shows a second embodiment of a blood-simulating fishing lure in which the aluminum ball chain 14 is threaded through a plug 24 of a type commonly referred to as a crankbait. This type of plug is characterized by two treble hooks 28 and a lip 26 that causes the plug 24 to dive as it is pulled through the water. The lure illustrated by FIG. 4 is particularly useful for catching walleye and northern pike, as anglers when fishing for walleye and northern pike commonly use the plug 24 of the type shown in FIG. 4. The blood-simulating fishing lure may be used with different sizes and configurations of plugs or other types of artificial baits, depending on the type or size of the fish to be caught.

Figure 5:
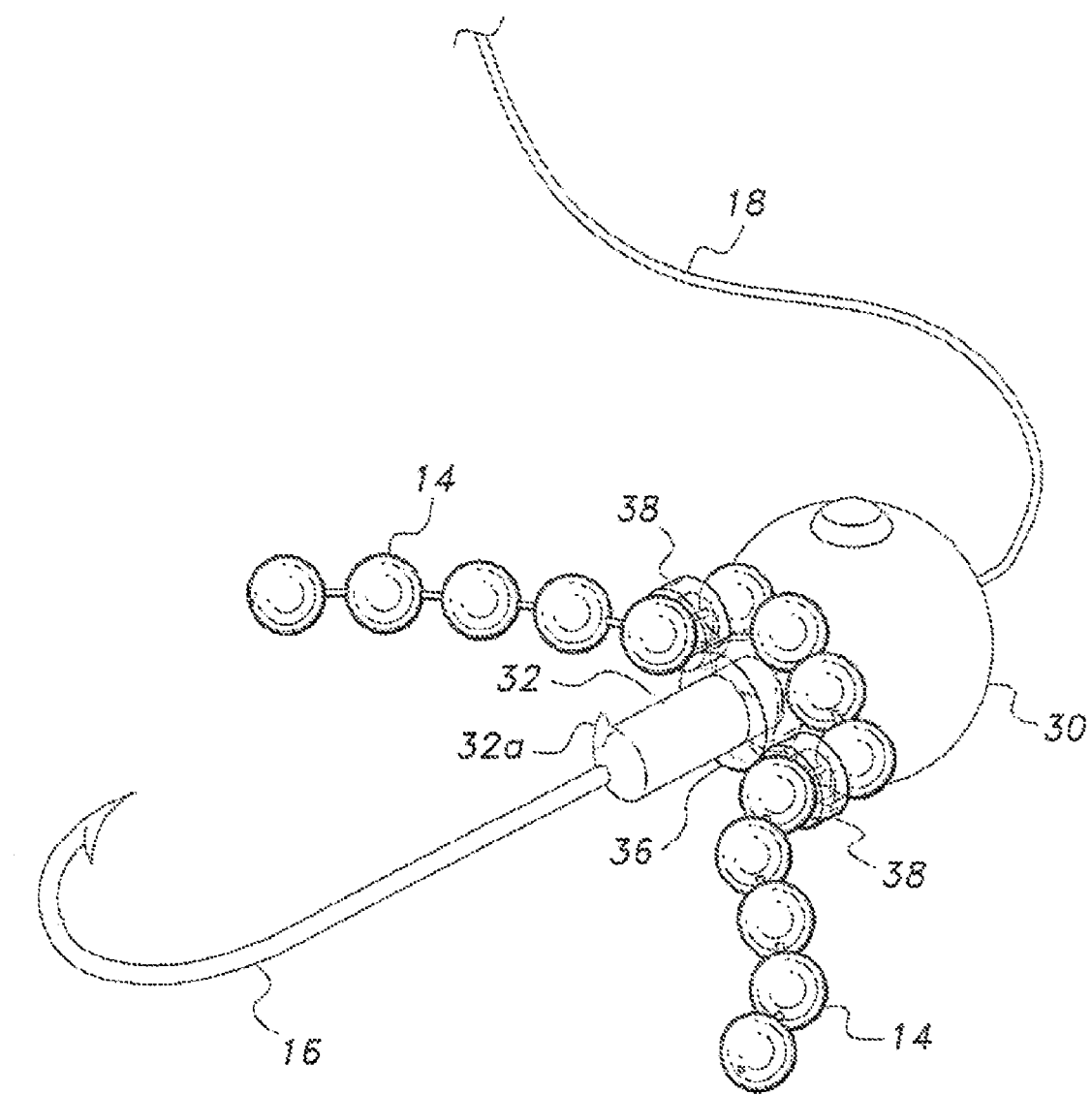
FIG. 5 is a perspective view of a third embodiment of a blood-simulating fishing lure according to the present invention, showing the ball chain threaded through two O-rings oppositely attached to a central O-ring residing on the body of an artificial lure.
Figure 6:
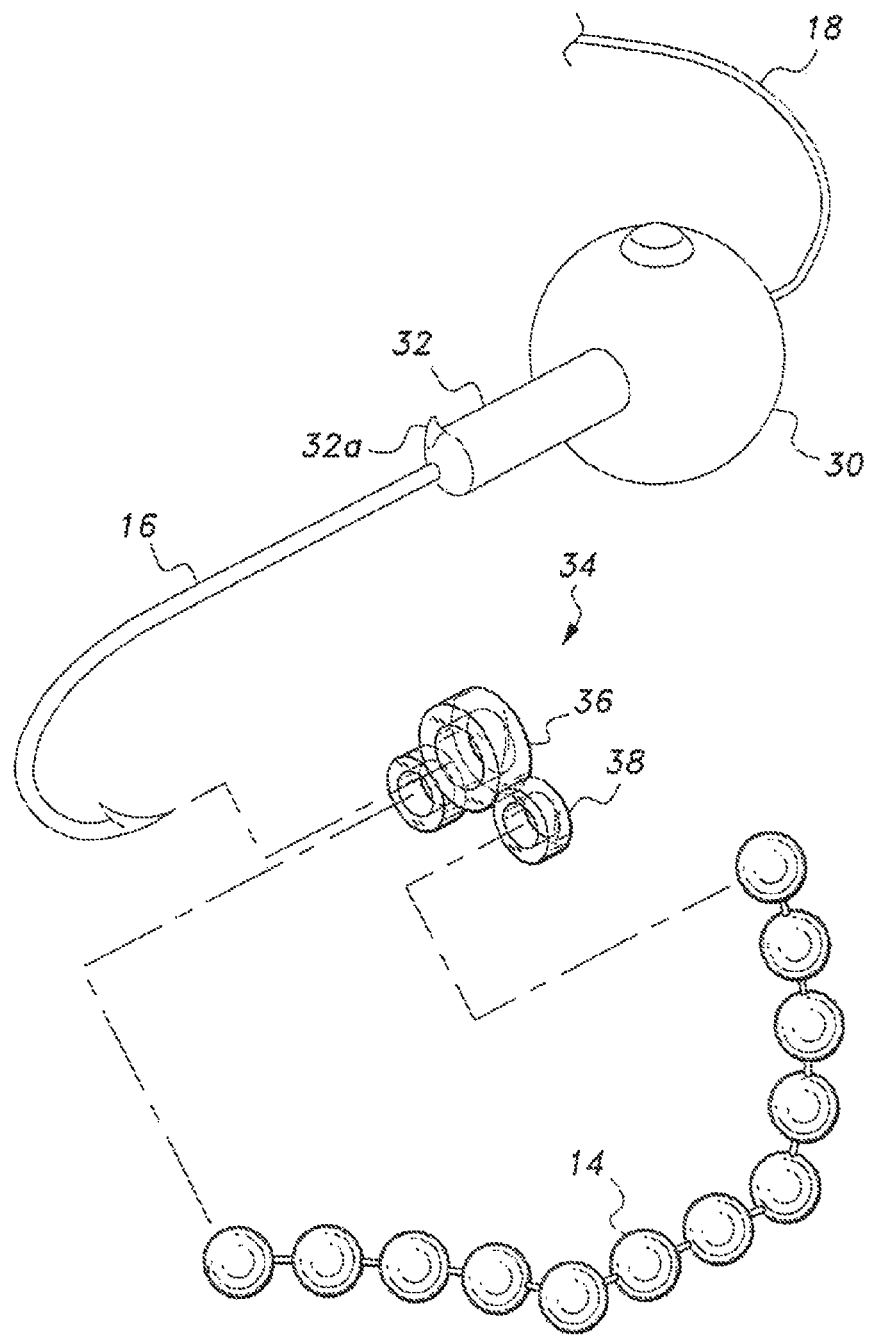
FIG. 6 is an exploded view of the blood-simulating fishing lure of FIG. 5, showing the component parts of the lure.

Although FIGS. 1-4 show the ball chain 14 extending through the body of a float or lure, the ball chain 14 may be attached to the float or lure in any convenient manner. FIGS. 5 and 6 show a jig head 30 having a shaft 32 extending therefrom. A chain mount 34 is formed from a central annular ring 36, preferably made from a resilient material, such as natural or artificial rubber. Auxiliary annular chain mounting rings 38 are joined to the outer surface of the central ring 36 by adhesive, by ultrasonic welding, by being molded in one piece, by thermal welding, or by any other technique for joining rings together. The rings 36 and 38 are arranged with the annulus of each auxiliary ring 38 parallel to the annulus of the central ring 36, and may be arranged in collinear or triangular configuration. The diameter of the central ring 36 is slightly smaller that the diameter of shaft 32, being dimensioned and configured for resiliently gripping the shaft 32 of the jig head 30. The auxiliary chain mounting rings 36 are dimensioned and configured for at least guiding opposite ends of the ball chain 14 so that the ends of the chain 14 trail away separately from the jig head 30 on generally opposite sides of the jig head 30, and may have a diameter slightly smaller, than the diameter of the balls, being dimensioned and configured for resiliently gripping one of the balls of the chain 14. A barb 32a may be disposed on the shaft 32 of jig head 30 as an additional aid to prevent the ring from slipping off the shaft 32.

Although the chain mount 34 has been described as being made of resilient material, it need not be, and may be made from a material having a coefficient of friction sufficient to frictionally retain the shaft 32 and chain 14. The chain mount 34 may have only a single auxiliary ring 38, and may grip or retain the ball chain 14 by a single end of the chain 14, if desired. Finally, the ball chain 14 may be attached to the float or lure by any other convenient means, e.g., by tying the ball chain 14 to the float or lure by flexible line, etc.

Figure 7:
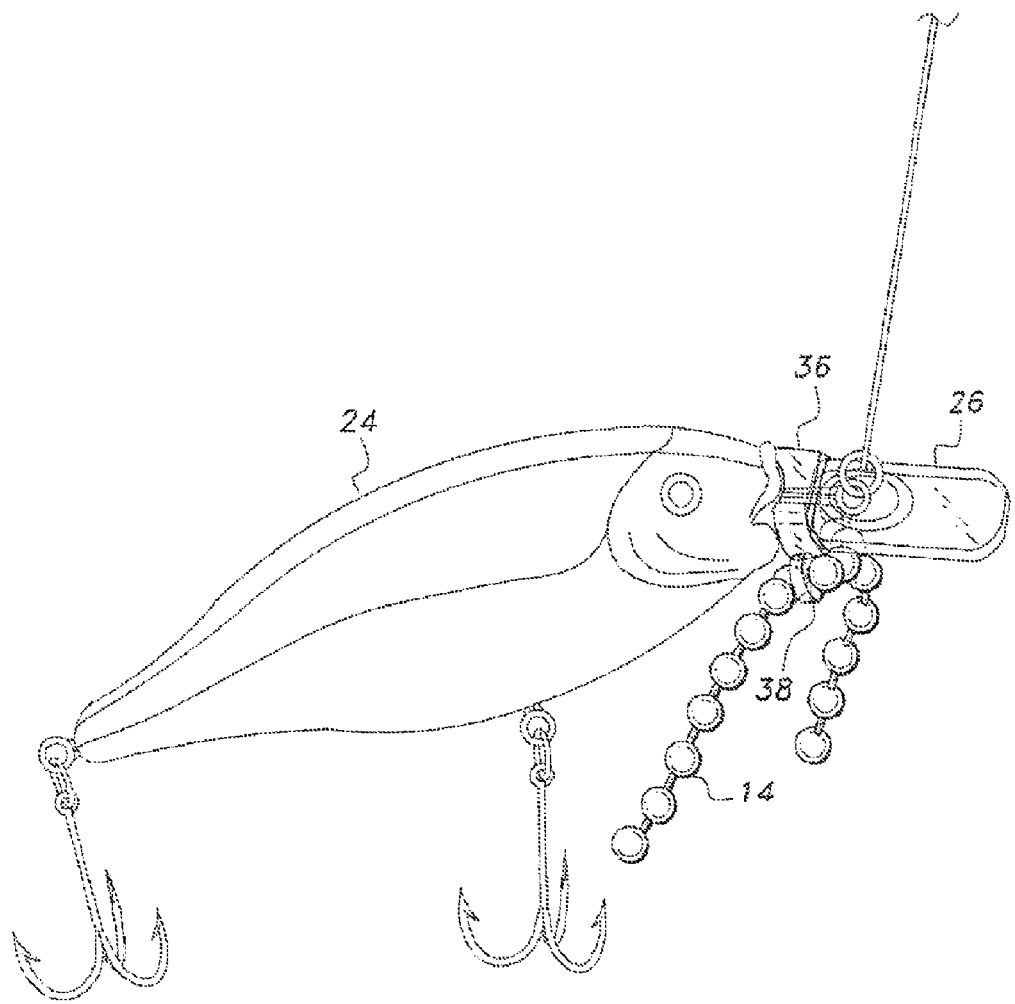
FIG. 7 is a view of a fourth embodiment of a blood-simulating fishing lure according to the present invention, showing the O-rings disposed on the lip of a plug.
Figure 8:
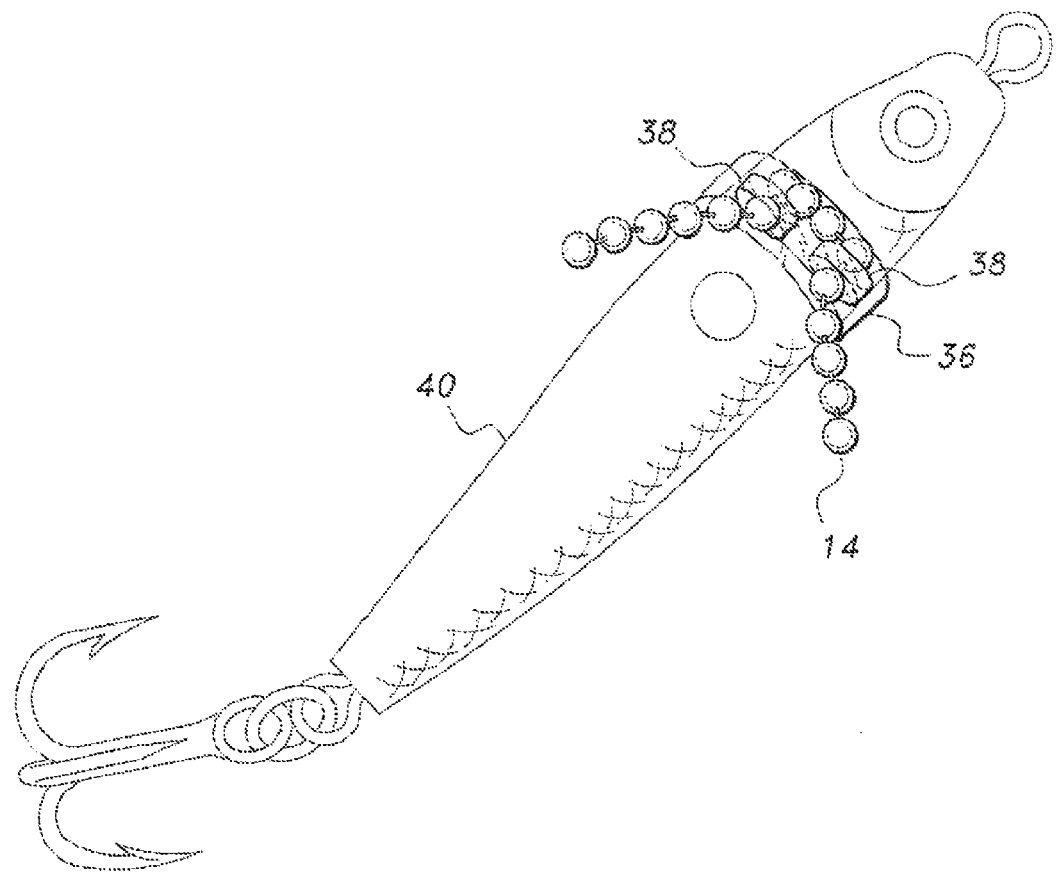
FIG. 8 is a fifth embodiment of a blood-simulating fishing lure according to the present invention, showing the O-rings disposed on a jigging spoon.
Figure 9:
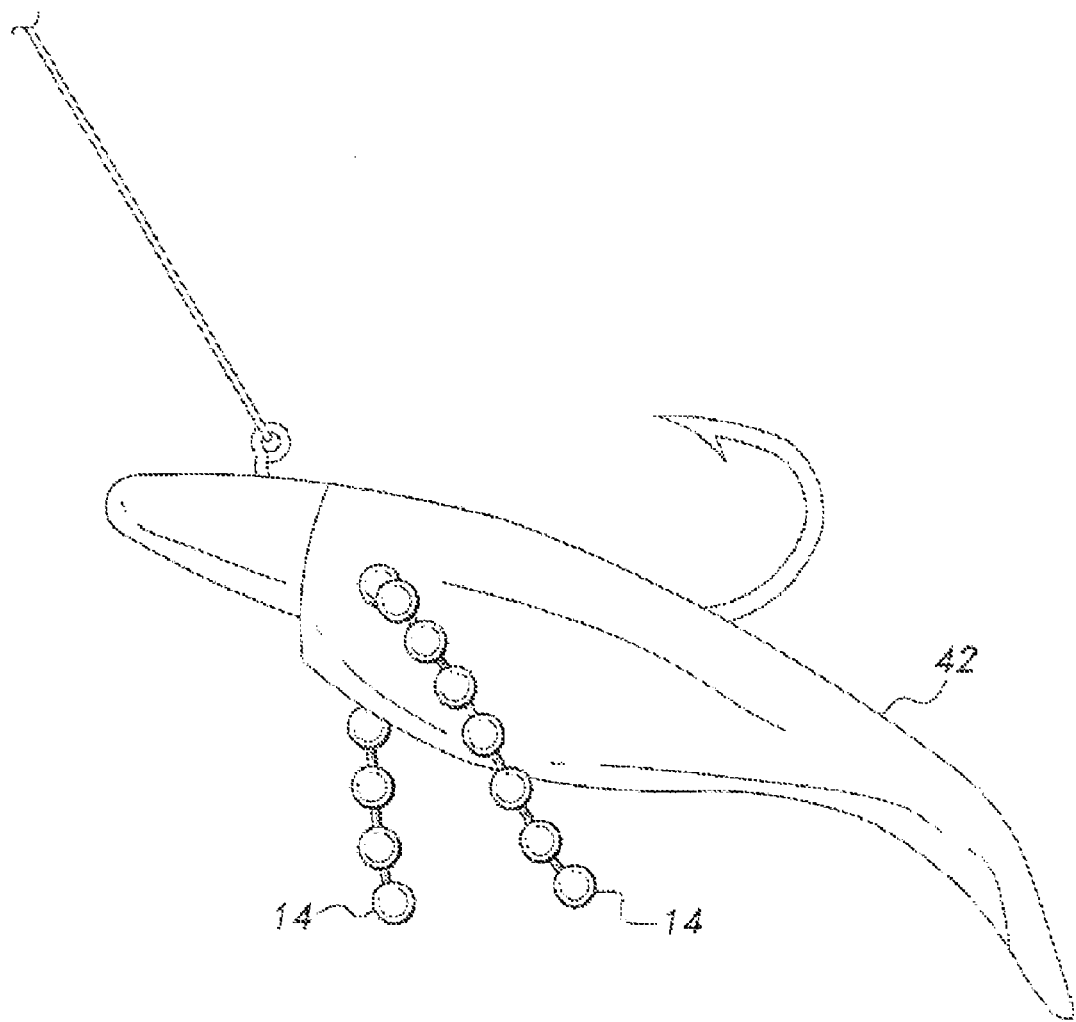
FIG. 9 is a sixth embodiment of a blood-simulating fishing lure according to the present invention, showing the ball chain threaded through a soft plastic swim bait.
Figure 10:
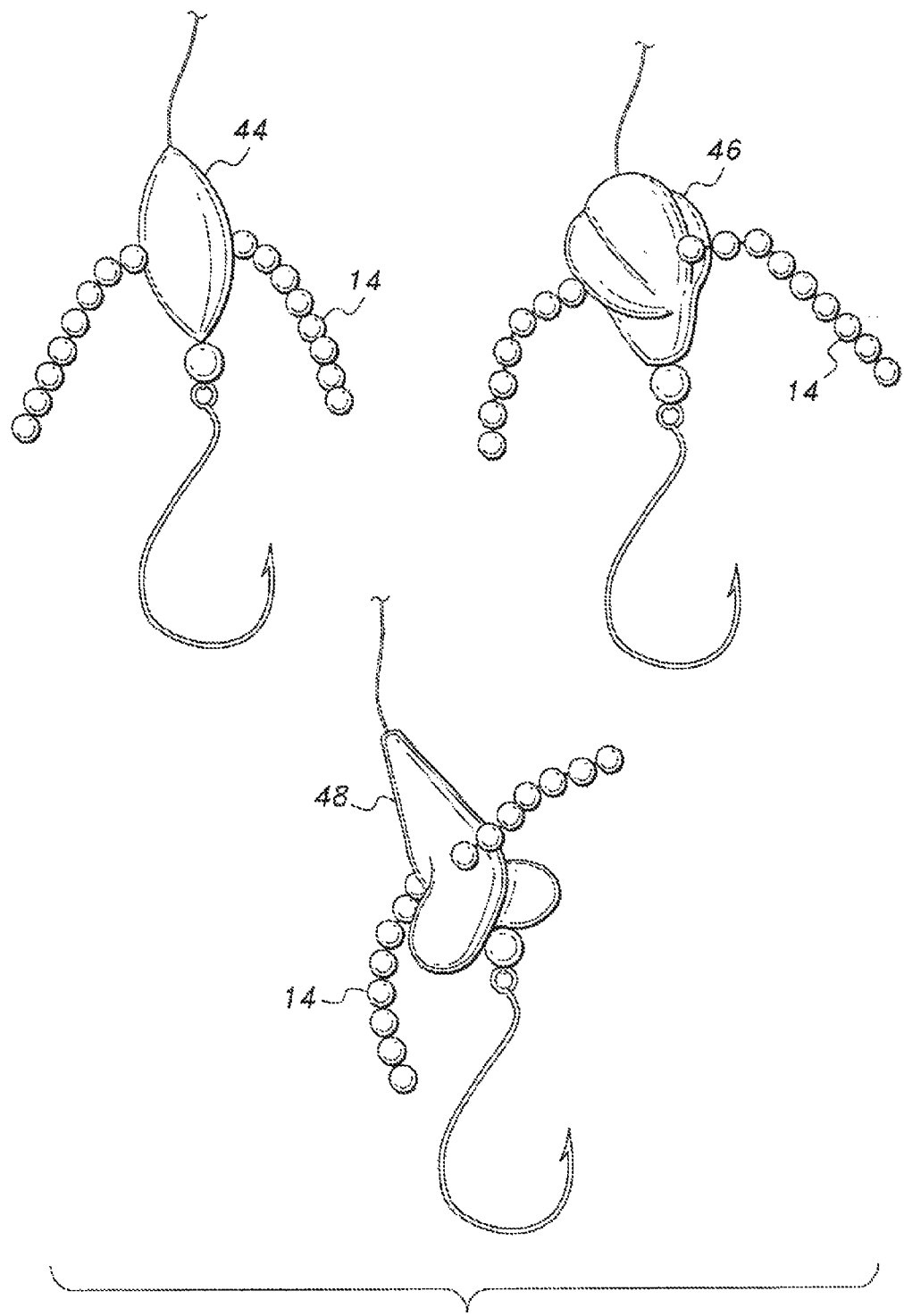
FIG. 10 disclose embodiments of a blood-simulating fishing lure according to the present invention, showing the ball chain threaded through football, prop tops and spin floats.
Figure 11:
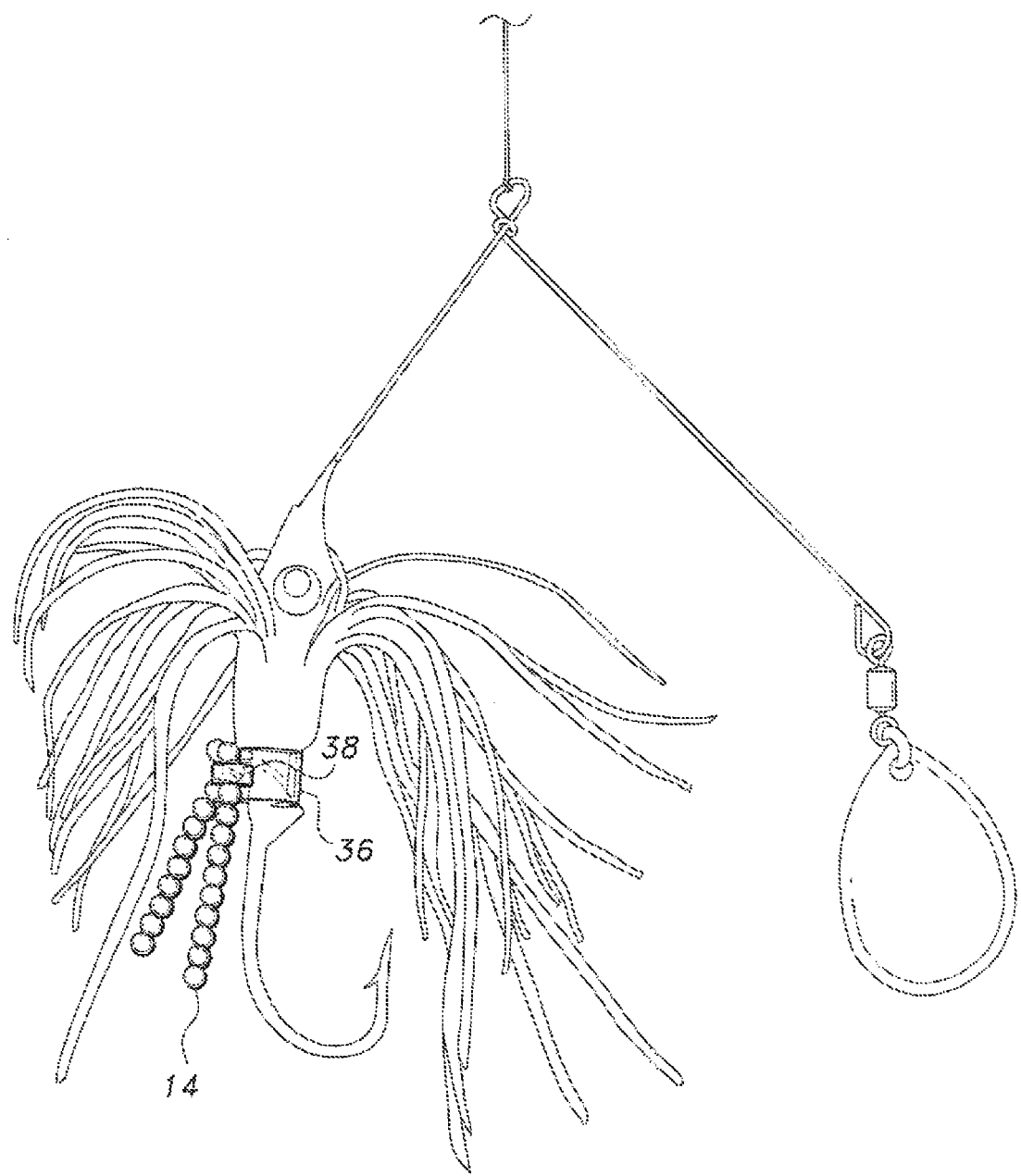
FIG. 11 discloses an embodiment of a blood-simulating fishing lure according to the present invention, showing the O-rings disposed on a spinnerbait.

In particular, as shown in FIG. 7, the chain mount 34 may be attached to a crankbait by looping the central ring 36 over the lip of the crankbait and sliding the mount 34 up to the mouth or gills of the lure. In another embodiment, shown in FIG. 8, the central ring 36 is mounted over a popular plug 40 called a jigging spoon (also known in the trade as a slab spoon that can be jigged). Instead of using the mount 34, a hole may be punctured through an artificial lure, such as a plastic minnow 42 (known in the trade as soft plastic swim baits), as shown in FIG. 9, and the ball chain may be pulled partially through the lure so that a portion of the ball chain extends from each side of the lure. FIG. 10 is illustrative of other embodiments that show the ball chain utilized with a football float 44, a spin float 46 and a prop tops float 48. FIG. 11 shows the chain mount assembly mounted on a spinnerbait. Further, the lure may be marketed as a kit by simply packaging the chain mount 34 with a ball chain so that the components that simulate the trail of blood may be attached to any desired lure using the mount. Alternatively, the ball chain may be marketed as a kit by packaging a ball chain with an implement for piercing a plastic minnow or other artificial lure, or packaged with an implement for piercing a plug, so that the ball chain may be extended through the body of any desired lure.

Although the blood-simulating fishing lure has been illustrated with certain floats and lures, it will be understood that the blood-simulating fishing lure is not limited thereto, but may comprise the ball chain in combination with any type of float or artificial lure body.

It is to be understood that the present invention is not limited to the embodiments described above, but encompasses any and all embodiments within the scope of the following claims.

I claim:
1. A blood-simulating fishing lure kit, comprising:
   (a) a flexible ball chain having a plurality of uniformly spaced lightweight spherical elements antipodally interconnected by rod members effective for simulating a flow of blood droplets, and
   (b) a chain mount having a elastic central ring configured and arranged for elastic fitted engagement around a fishing lure body and at least one auxiliary annular chain mounting ring disposed radically alongside the central ring, the ball chain extending through the at least one auxiliary chain mounting ring and extending therefrom.
2. A fishing lure attachment of claim 1 wherein the central ring has a bore that defines a primary axis and the ball chain emanates from the chain mount in a direction orthogonal to the primary axis.
3. A fishing lure attachment of claim 2 wherein the spherical elements are red to simulate blood droplets.
4. A fishing lure attachment of claim 1 wherein the central ring has a bore and the ball chain emanates from the chain mount tangential to the bore.
5. A fishing lure attachment of claim 4 wherein the ball and chain has at least nine spherical elements.
6. A fishing lure attachment of claim 5 wherein the ball chain extends from both sides of the central ring.

* * * * *